United States Patent
Kobiki et al.

(10) Patent No.: US 9,832,393 B2
(45) Date of Patent: Nov. 28, 2017

(54) IMAGE PROCESSOR, IMAGE PROCESSING METHOD, AND IMAGE PROJECTOR

(71) Applicant: KABUSHIKI KAISHA TOSHIBA, Minato-ku, Tokyo (JP)

(72) Inventors: Hisashi Kobiki, Kawasaki Kanagawa (JP); Masahiro Baba, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 14/570,237

(22) Filed: Dec. 15, 2014

(65) Prior Publication Data

US 2015/0208052 A1    Jul. 23, 2015

(30) Foreign Application Priority Data

Jan. 20, 2014    (JP) ................................ 2014-007880

(51) Int. Cl.
   - *G03B 21/14*    (2006.01)
   - *H04N 9/31*     (2006.01)
   - *H04N 5/262*    (2006.01)

(52) U.S. Cl.
   CPC ......... *H04N 5/2628* (2013.01); *H04N 9/3182* (2013.01); *H04N 9/3185* (2013.01); *H04N 9/3194* (2013.01)

(58) Field of Classification Search
   CPC .. H04N 9/3182; H04N 9/3185; H04N 9/3194; G03B 21/14
   USPC ..... 345/589, 590, 593, 595; 353/28, 69, 121
   See application file for complete search history.

(56) References Cited

U.S. PATENT DOCUMENTS

| | | | | |
|---|---|---|---|---|
| 7,866,833 B2* | 1/2011 | Bang | .................. | H04N 9/3182 345/600 |
| 8,553,070 B2* | 10/2013 | Tsukagoshi | ........ | H04N 13/0018 348/42 |
| 8,870,393 B2* | 10/2014 | Kawahara | ............ | H04N 9/3182 345/589 |

(Continued)

FOREIGN PATENT DOCUMENTS

| | | |
|---|---|---|
| JP | H06-054352 | 2/1994 |
| JP | 2006-259627 | 9/2006 |

(Continued)

OTHER PUBLICATIONS

Office Action dated Apr. 25, 2017 in counterpart Japanese Patent Application No. JP2014-007880.

(Continued)

*Primary Examiner* — William C Dowling
(74) *Attorney, Agent, or Firm* — Nixon & Vanderhye, P.C.

(57) ABSTRACT

According to one embodiment, an image processor including: a corrector; a simulator; and a parameter calculator. The corrector calculates a correction image regarding a first image. The first image is processed. The simulator calculates a simulation image using the correction image. The simulation image is estimated to be acquired when the correction image is projected on a projection surface. The parameter calculator calculates a correction parameter regarding the projection surface using the simulation image and a second image acquired by imaging the projection surface. The corrector calculates the correction image using the first image and the correction parameter.

20 Claims, 3 Drawing Sheets

(56) References Cited

U.S. PATENT DOCUMENTS

| | | | |
|---|---|---|---|
| 9,030,538 B2* | 5/2015 | Jung | H04N 13/0422 348/56 |
| 2005/0001986 A1* | 1/2005 | Matsuda | G09G 3/002 353/31 |
| 2005/0206851 A1* | 9/2005 | Yokoyama | G09G 3/3611 353/69 |
| 2008/0036976 A1* | 2/2008 | Han | H04N 9/3194 353/69 |
| 2009/0244318 A1 | 10/2009 | Makii | |
| 2010/0171933 A1* | 7/2010 | Kim | H04N 9/3182 353/31 |
| 2013/0021585 A1* | 1/2013 | Tamura | G09G 5/00 353/69 |
| 2014/0104581 A1* | 4/2014 | Yoshimura | G03B 21/26 353/30 |
| 2014/0184662 A1 | 7/2014 | Kobiki et al. | |
| 2015/0268537 A1* | 9/2015 | Kinebuchi | G03B 21/142 353/97 |

FOREIGN PATENT DOCUMENTS

| | | |
|---|---|---|
| JP | 2009-253575 | 10/2009 |
| JP | 2009-258205 | 11/2009 |
| JP | 2012-028877 | 2/2012 |
| JP | 2013-073076 | 4/2013 |
| JP | 2014-126782 | 7/2014 |

OTHER PUBLICATIONS

English-language machine translation of JP2006-259627.
English-language machine translation of JP2009-253575.
English-language machine translation of JP2009-258205.
English-language machine translation of JP2012-028877.
English-language machine translation of JP2013-073076.
English-language machine translation of JPH06-054352.

* cited by examiner

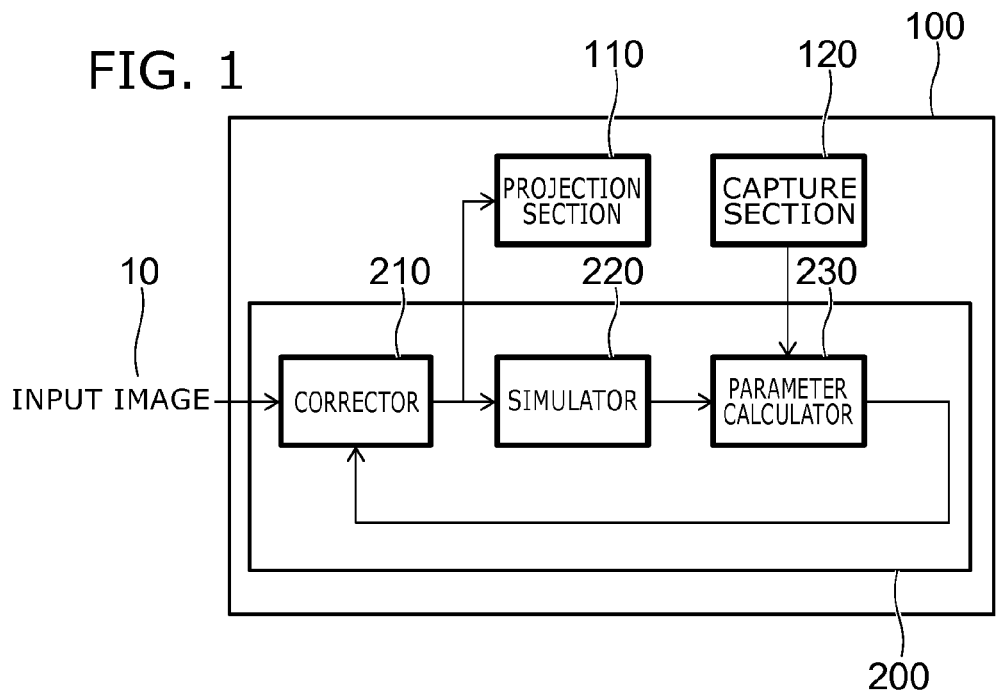
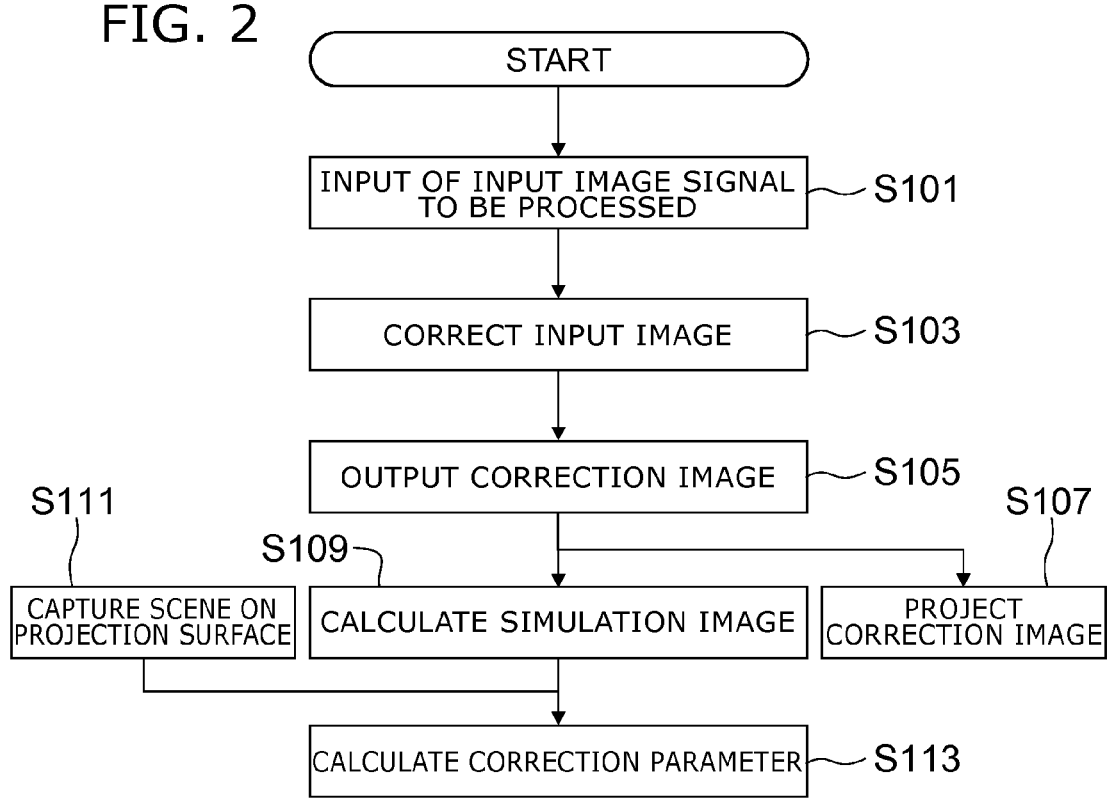

IMAGE PROCESSOR, IMAGE PROCESSING METHOD, AND IMAGE PROJECTOR

CROSS-REFERENCE TO RELATED APPLICATIONS

This application is based upon and claims the benefit of priority from Japanese Patent Application No. 2014-007880, filed on Jan. 20, 2014; the entire contents of which are incorporated herein by reference.

FIELD

Embodiments described herein relate generally to an image processor, an image processing method, and an image projector.

BACKGROUND

When a picture is projected on a projection surface using an image projector such as a projector device, the picture may be corrected in accordance with the texture of the projection surface and the change of the projection surface. By such a technique, a good picture is projected on any projection surface. Typically, in such a technique, when the picture is corrected in accordance with the change of the projection surface, information regarding the projection surface such as reflectance needs to be estimated by comparing the projection image projected on the projection surface with the capture image obtained by capturing the projection image. Here, the projection image and the capture image need to be associated with each other in one-to-one correspondence in order to accurately estimate the information regarding the projection surface.

However, when a moving image is displayed, for instance, the projection image may be changed during acquiring the capture image. Then, accurate information regarding the projection surface cannot be estimated. A technique is desired that can accurately estimate information regarding the projection surface and project a good picture adapted to the projection surface even if the projection image is changed during acquiring the capture image.

BRIEF DESCRIPTION OF THE DRAWINGS

FIG. 1 is a block diagram showing an image processor and an image projector according to an embodiment of the invention;

FIG. 2 is a flow chart describing an image processing method according to this embodiment;

DETAILED DESCRIPTION

Figure 3:
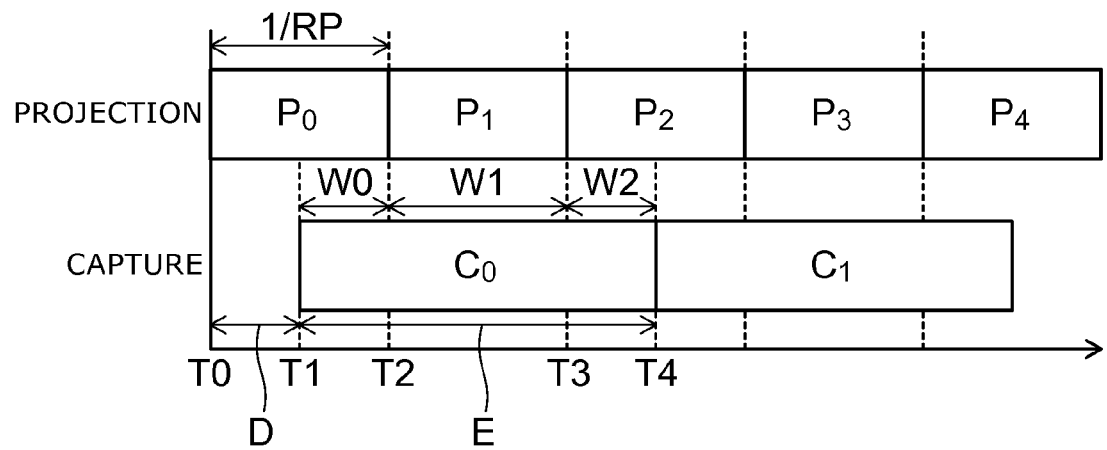
FIG. 3 is a timing chart illustrating an example of the method for calculating a simulation image of this embodiment.

In general, according to one embodiment, an image processor including: a corrector; a simulator; and a parameter calculator. The corrector calculates a correction image regarding a first image. The first image is processed. The simulator calculates a simulation image using the correction image. The simulation image is estimated to be acquired when the correction image is projected on a projection surface. The parameter calculator calculates a correction parameter regarding the projection surface using the simulation image and a second image acquired by imaging the projection surface. The corrector calculates the correction image using the first image and the correction parameter.

Embodiments of the invention will now be described with reference to the drawings. In the drawings, similar components are labeled with like reference numerals, and the detailed description thereof is omitted appropriately.

FIG. 1 is a block diagram showing an image processor and an image projector according to an embodiment of the invention.

The block diagram shown in FIG. 1 is an example of the main configuration of the image processor according to this embodiment, and is not necessarily in agreement with the configuration of actual program modules. This also applies to the main configuration of the image processor shown in FIG. 4.

The image projector 100 shown in FIG. 1 includes an image processor 200, a projection section 110, and a capture section 120.

The image processor 200 includes a corrector 210, a simulator 220, and a parameter calculator 230.

The image processor 200 may be an external device different from the image projector 100, or may be a device included in the image projector 100. The hardware configuration shown in FIG. 1 is only illustrative. Part or all of the image processor 200 according to the embodiments may be realized as an integrated circuit such as LSI (large scale integration) or an IC (integrated circuit) chip set. The functional blocks may be individually configured as processors. Alternatively, some or all of the functional blocks may be integrated into a processor. The integrated circuit is not limited to LSI, but may be configured as a dedicated circuit or in a general-purpose processor. These also apply to the image processor and the image projector shown in FIG. 4.

The image projector 100 projects a picture on a projection surface outside the image projector 100. The projection surface includes not only a general projection screen, but also a projection surface with texture and color, such as an indoor or outdoor wall surface, floor, and ceiling.

The signal format of the input image (image to be processed: first image) 10 can be variously assumed. In this embodiment, each pixel has pixel values of brightness in three channels composed of a red component, a green component, and a blue component. The brightness of each channel at position (u,v) in the screen is denoted by brightness value I(u,v). Here, the signal of each channel may be calculated by a linear transformation from a nonlinear gradation value. For instance, the signal of each channel may be calculated from an input signal based on e.g. the YCbCr transmission standards of the International Telecommunication Union. The signal of the input image 10 may be the signal of an image inputted from any device or medium. For instance, the signal of the input image 10 may be at least one of the signal of an image inputted from a recording medium such as HDD, a signal inputted from an external device connected through a network, and the signal of an image inputted from e.g. a TV (television) broadcast wave. The input image 10 includes e.g. a moving image or a still image.

The corrector 210 calculates a correction image (e.g., third image) using the input image 10 and a correction parameter outputted from the parameter calculator 230. The corrector 210 performs correction for each image. The parameter used for correction by the corrector 210 may be updated at regular intervals. Alternatively, the parameter used for correction by the corrector 210 may be updated in the case where the change of the state of the projection surface exceeds a prescribed reference (e.g., in the case where the reference value becomes more than or equal to a threshold). This can suppress degradation of visibility due to temporal change of the projection image. In the case where the input image 10 includes a moving image, the parameter used for correction by the corrector 210 may be updated sequentially. In the case where the input image 10 includes a still image, the parameter used for correction by the corrector 210 does not need to be updated. The determination of whether to update the parameter may be performed depending on whether the input image 10 includes a moving image or a still image. The corrector 210 outputs the calculated correction image to the projection section 110 and the simulator 220.

The projection section 110 projects the correction image outputted from the corrector 210 on the projection surface. The projection section 110 only needs to be a general projector such as a liquid crystal projector and a laser projector.

The capture section 120 captures a scene on the projection surface on which the projection section 110 projects the correction image. The capture section 120 calculates a capture image (second image). The capture section 120 outputs the capture image to the parameter calculator 230. The capture section 120 only needs to be a general capture device including electronic optical capture devices such as CDD (charge coupled device) and CMOS (complementary metal oxide semiconductor).

The simulator 220 calculates a simulation image (e.g., fourth image) using the correction image outputted from the corrector 210. It is estimated that the simulation image is obtained if the capture section 120 captures the scene on the projection surface on which the projection section 110 projects the correction image. The simulator 220 outputs the calculated simulation image to the parameter calculator 230.

The parameter calculator 230 calculates a correction parameter for correcting e.g. the texture and color of the projection surface using the simulation image outputted from the simulator 220 and the capture image outputted from the capture section 120. The parameter calculator 230 outputs the calculated correction parameter to the corrector 210.

FIG. 2 is a flow chart describing an image processing method according to this embodiment.

FIG. 3 is a timing chart illustrating an example of the method for calculating a simulation image of this embodiment.

The signal of the input image 10 to be processed is inputted to the corrector 210 (step S101). The correction parameter calculated by the parameter calculator 230 is inputted to the corrector 210. The corrector 210 calculates a correction image by correcting the input image 10 based on the correction parameter (step S103). The correction parameter is information regarding the projection surface calculated and outputted by the parameter calculator 230.

The brightness A at position (u,v) of the correction image is outputted by the following equation.

$$A(u,v) = (I(u,v) - G(u,v))/H(u,v) \quad (1)$$

"I" in Equation (1) represents the brightness of the input image 10. "G" in Equation (1) represents the amount of reflection light of the outside light reflected by the projection surface (brightness of reflection light of outside light) (hereinafter referred to as "outside light offset" for convenience of description). The outside light is light other than the light applied from the projection section 110, such as light applied from an indoor lighting. "H" in Equation (1) represents the reflectance of the projection surface for each color component. According to Equation (1), the brightness A of the correction image is calculated as follows. The outside light offset G is subtracted from the brightness I of the input image 10. This difference is divided by the reflectance H. The result is the brightness A of the correction image. Thus, the corrector 210 can output a correction image in view of the influence of the outside light offset G of the projection surface and the reflectance H of the projection surface (step S105). Here, the method for calculating the brightness A of the correction image is not limited to Equation (1).

Next, the projection section 110 projects the correction image outputted from the corrector 210 on the projection surface (S105). Here, a registration is preferably provided in advance so that the position (u,v) of the correction image is aligned with the position (u',v') on the projection surface. For instance, preferably, a correspondence has been determined between the pixel of the correction image and the region on the projection surface. Thus, accurate pixelwise alignment can be performed between the correction image and the projection surface. Furthermore, for instance, a prescribed region on the projection surface is clipped and subjected to geometric correction and region correction. Thus, preferably, a correspondence has been determined between the pixel of the correction image and the region on the projection surface. The outside light offset at the position (u',v') on the projection surface is denoted by G(u',v'). The reflectance at the position (u',v') on the projection surface is denoted by H(u',v'). Then, the correction image P is corrected so that the influence of the outside light offset G(u',v') and the reflectance H(u',v') is taken into consideration in advance. This correction image P is projected from the projection section 110. Thus, even in the case where the projection surface has a texture, a good picture adapted to the projection surface is projected.

By steps S101-S107, the correction parameter including information regarding the projection surface is used to correct the input image 10. Thus, a good picture adapted to the texture of the projection surface and the change of the projection surface can be projected.

The capture section 120 captures a full view image on the projection surface on which the projection section 110 projects the correction image. The capture section 120 calculates a capture image (step S111). The capture section 120 outputs the capture image to the parameter calculator 230.

The capture section 120 captures a scene on the projection surface on which the correction image is projected when the projection section 110 projects the correction image on the projection surface. At this time, the light reflected from the projection surface includes a mixture of the reflection light of the light outputted by the projection section 110 and the reflection light of the outside light other than the light outputted by the projection section 110. However, the capture section 120 captures a scene on the projection surface on which the projection section 110 projects the correction image. Thus, the parameter calculator 230 can obtain information for separating the reflectance as a correction parameter from the outside light offset as a correction parameter.

In step S111, the capture section 120 sets the exposure time (also referred to as shutter speed) of the optical capture device to E seconds in the prescribed period of 1/RC seconds based on the refresh rate RC preset in the capture section 120. Thus, the capture section 120 acquires the full view image. From the acquired full view image, the capture section 120 detects a region in which the correction image is projected. The capture section 120 performs registration so that the position (u,v) of the correction image is aligned with the position (u',v') of the capture image. Then, the capture section 120 outputs the aligned capture image as a capture image C. At this time, for instance, preferably, a correspondence has been determined between the pixel of the correction image and the pixel of the capture image. Thus, accurate pixelwise alignment can be performed between the correction image and the capture image. Furthermore, for instance, a prescribed region on the projection surface is clipped and subjected to geometric correction and region correction. Thus, preferably, a correspondence has been determined between the pixel of the correction image and the pixel of the capture image.

The simulator 220 calculates a simulation image using the correction image outputted from the corrector 210. It is estimated that the simulation image is obtained if the capture section 120 captures the scene on the projection surface on which the projection section 110 projects the correction image (step S109). The simulator 220 outputs the calculated simulation image to the parameter calculator 230.

The method for calculating a simulation image in step S109 is further described with reference to FIG. 3.

FIG. 3 is described with reference to an example in which the prescribed period of 1/RP seconds based on the refresh rate RP preset in the projection section 110 is shorter than the exposure time of E seconds of the optical capture device in the capture section 120. Furthermore, FIG. 3 is described with reference to an example in which the time difference D between the timing of starting projection by the projection section 110 (e.g., timing T0) and the timing of starting capture by the capture section 120 (e.g., timing T1) is known in advance. In other words, FIG. 3 is described with reference to an example in which the time mismatch between the timing of starting projection by the projection section 110 and the timing of starting capture by the capture section 120 is known in advance.

The horizontal axis of the timing chart shown in FIG. 3 represents time.

The upper row of the timing chart shown in FIG. 3 represents the period in which the projection section 110 performs projection. The projection section 110 projects correction images $P_0$, $P_1$, . . . , each for 1/RP seconds. In other words, the projection section 110 switches projection of the correction images $P_0$, $P_1$, . . . for every 1/RP seconds.

The lower row of the timing chart shown in FIG. 3 represents the period in which the capture section 120 performs capture. The capture section 120 acquires capture images $C_0$, $C_1$, . . . , each for E seconds. In other words, the capture section 120 switches acquisition of the capture images $C_0$, $C_1$, . . . for every E seconds.

In the example shown in FIG. 3, the projection section 110 projects the correction images $P_0$, $P_1$, and $P_2$ while the capture section 120 acquires the capture image $C_0$. The time period in which the correction image $P_0$ is received by the capture device of the capture section 120 is W0 (timing T1-T2). The time period in which the correction image $P_1$ is received by the capture device of the capture section 120 is W1 (timing T2-T3). The time period in which the correction image $P_2$ is received by the capture device of the capture section 120 is W2 (timing T3-T4). The simulator 220 generates an image by integrating a plurality of past correction images depending on the capture parameter used by the capture section 120 in capturing the correction images. For instance, the simulator 220 generates an image by integrating a plurality of past correction images depending on the time period (capture time) in which the capture section 120 has performed capture. Specifically, the simulator 220 calculates a simulation image by making a weighted sum of the correction images $P_0$, $P_1$, and $P_2$ depending on the ratio of the time periods W0, W1, and W2. The time period W0 is a time period in which the correction image $P_0$ is received by the capture device. The time period W1 is a time period in which the correction image $P_1$ is received by the capture device. The time period W2 is a time period in which the correction image $P_2$ is received by the capture device. In the case where the exposure time of the capture section 120 is fixed, the simulator 220 may generate an image by integrating a plurality of past correction images depending on the capture time (timing) of the capture section 120.

The information regarding the correction image projected by the projection section 110 and the information regarding the capture image captured by the capture section 120 need to be associated with each other in one-to-one correspondence in order to accurately estimate the correction parameter as information regarding the projection surface. In step S109, as shown in the timing chart shown in FIG. 3, the projection image may be changed while the capture section 120 acquires a capture image. In this case, the simulator 220 generates a simulation image in view of the change of the projection image and outputs it to the parameter calculator 230. Thus, accurate information regarding the projection surface can be estimated in the parameter calculator 230.

In the case where the exposure time E of the optical capture device in the capture section 120 is relatively long, the simulator 220 calculates a simulation image using a past correction image of a relatively long time. In the case where the exposure time E of the optical capture device in the capture section 120 is relatively short, the simulator 220 calculates a simulation image using a past correction image of a relatively short time.

In the case where the refresh rate RC preset in the capture section 120 is relatively low, the simulator 220 calculates a simulation image using a past correction image of a relatively long time. In the case where the refresh rate RC preset in the capture section 120 is relatively high, the simulator 220 calculates a simulation image using a past correction image of a relatively short time.

Also in the case where the prescribed period of 1/RP seconds based on the refresh rate RP is longer than the exposure time of E seconds, processing similar to that described with reference to FIG. 3 can be performed. Thus, the method for calculating a simulation image is not limited to the calculation method described with reference to FIG. 3.

Returning to FIG. 2, the parameter calculator 230 calculates the reflectance H of the projection surface as a correction parameter and the outside light offset G of the projection surface as a correction parameter using the simulation image outputted from the simulator 220 and the capture image outputted from the capture section 120 (step S113). The parameter calculator 230 outputs the calculated reflectance H and the calculated outside light offset G to the corrector 210.

In step S113, any method may be used as the method for calculating the correction parameter. In this embodiment, as an example, the simulation images S outputted by the simulator 220 and the capture images C outputted by the capture section 120 are used, n images for each. Thus, the reflectance H(u,v) at the position (u,v) of the projection surface and the outside light offset G(u,v) at the position (u,v) of the projection surface are calculated by the following equation.

$$C_{t-n+1}(u, v) = S_{t-n+1}(u, v) \times H(u, v) + G(u, v)$$
$$C_{t-n+2}(u, v) = S_{t-n+2}(u, v) \times H(u, v) + G(u, v)$$
$$...$$
$$C_t(u, v) = S_t(u, v) \times H(u, v) + G(u, v)$$
(2)

"$C_{t-n+1}$", "$C_{t-n+2}$", ..., "$C_t$" in Equation (2) represent past capture images including the current frame t. "$S_{t-n+1}$", "$S_{t-n+2}$", ..., "$S_t$" in Equation (2) represent past simulation images including the current frame t. In Equation (2), two variables H(u,v) and G(u,v) are unknown. Thus, the reflectance H(u,v) at the position (u,v) of the projection surface and the outside light offset G(u,v) at the position (u,v) of the projection surface can be calculated by simultaneously solving Equation (2) using n=2 or more past frames.

By step S113, the parameter calculator 230 compares the correction image projected on the projection surface with the capture image obtained by capturing the projected correction image. Thus, the parameter calculator 230 can acquire correction parameters such as reflectance and outside light offset as information regarding the projection surface. The corrector 210 generates a correction image using the correction parameters as information regarding the projection surface. Thus, the projection section 110 can project a good picture adapted to the texture of the projection surface and the change of the projection surface. For instance, correction can be performed by associating the projected image with the capture image even in the case of projecting contents such as moving images in which the projected image is changed in time series. Thus, a good picture sequentially adapted to the change of the projection surface can be projected.

Next, an alternative embodiment of the invention is described.

Figure 4:
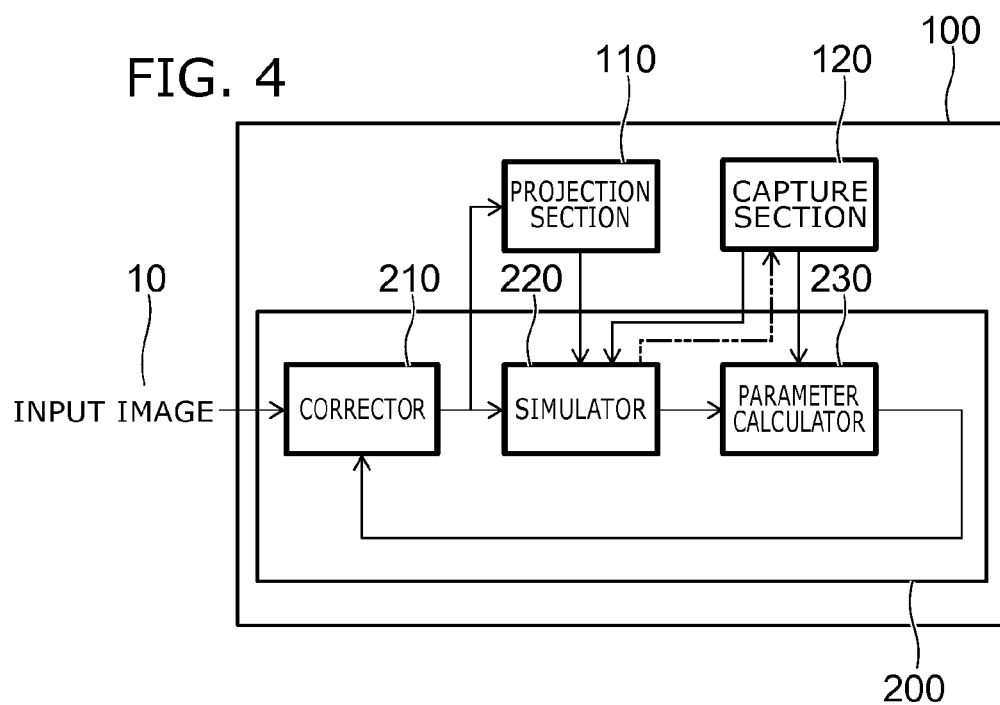
FIG. 4 is a block diagram showing an image processor and an image projector according to an alternative embodiment of the invention.

FIG. 4 is a block diagram showing an image processor and an image projector according to an alternative embodiment of the invention.

The image projector 100 shown in FIG. 4 includes an image processor 200, a projection section 110, and a capture section 120.

The image processor 200 includes a corrector 210, a simulator 220, and a parameter calculator 230.

The image projector 100 according to this embodiment may be configured by a combination of prescribed components before shipment as long as it includes the corrector 210, the simulator 220, the parameter calculator 230, the projection section 110, and the capture section 120 described above with reference to FIGS. 1 to 3. Alternatively, the image projector 100 according to this embodiment may be configured by a combination of components purchased by a user different from the combination described above with reference to FIGS. 1 to 3. Alternatively, in the image projector 100 according to this embodiment, part or all of the components may be replaced by those of different model numbers.

The corrector 210 calculates a correction image using the input image 10 and a correction parameter outputted from the parameter calculator 230. The corrector 210 outputs the calculated correction image to the projection section 110 and the simulator 220.

The projection section 110 projects the correction image outputted from the corrector 210 on the projection surface. The projection section 110 outputs a projection parameter during projection to the simulator 220.

The capture section 120 captures a scene on the projection surface on which the projection section 110 projects the correction image. The capture section 120 calculates a capture image of the captured scene and outputs it to the parameter calculator 230. The capture section 120 outputs a capture parameter during capture to the simulator 220.

The simulator 220 calculates a simulation image using the correction image outputted from the corrector 210, the projection parameter outputted from the projection section 110, and the capture parameter outputted from the capture section 120. It is estimated that the simulation image is obtained if the capture section 120 captures the scene on the projection surface on which the projection section 110 projects the correction image. The simulator 220 outputs the calculated simulation image to the parameter calculator 230.

Next, an image processing method according to this embodiment is described.

The processing in the corrector 210 shown in FIG. 4 is similar to the processing in the corrector 210 described above with reference to FIGS. 1 to 3. The processing in the parameter calculator 230 shown in FIG. 4 is similar to the processing in the parameter calculator 230 described above with reference to FIGS. 1 to 3.

In addition to the processing in the projection section 110 described above with reference to FIGS. 1 to 3, the projection section 110 shown in FIG. 4 outputs a projection parameter during projection to the simulator 220. The projection parameter is a variable regarding the projection scheme used by the projection section 110 in projecting the correction image. The simulator 220 uses the projection parameter outputted from the projection section 110 in generating a simulation image.

Specifically, the projection parameter includes information regarding the projection scheme such as field sequential driving and position dependent driving. Alternatively, the projection parameter includes e.g. the refresh rate during projection, and the resolution, color range, and chromaticity point of the projection image. The projection parameter may be automatically transmitted through a cable connecting the projection section 110 and the image processor 200. Alternatively, the projection parameter may be inputted to the image processor 200 manually by a user.

In addition to the processing in the capture section 120 described above with reference to FIGS. 1 to 3, the capture section 120 shown in FIG. 4 outputs a capture parameter during capture to the simulator 220. The capture parameter is a variable regarding the projection scheme used by the capture section 120 in capturing the projection surface. The simulator 220 uses the capture parameter outputted from the capture section 120 in generating a simulation image.

Specifically, the capture parameter includes e.g. the refresh rate during capture, the exposure time of the capture device during capture, automatic control information of the exposure time, and the resolution, color range, and chromaticity point of the capture image. The capture parameter may be automatically transmitted through a cable connecting the capture section 120 and the image processor 200. Alternatively, the capture parameter may be inputted to the image processor 200 manually by a user.

The simulator 220 calculates a simulation image using the correction image outputted from the corrector 210, the projection parameter outputted from the projection section 110, and the capture parameter outputted from the capture section 120. It is estimated that the simulation image is obtained if the capture section 120 captures the scene on the projection surface on which the projection section 110 projects the correction image. The simulator 220 outputs the calculated simulation image to the parameter calculator 230.

In the case where the driving method parameter in the projection parameters outputted from the projection section 110 indicates field sequential driving, the simulator 220 uses an image obtained by decomposing the correction image outputted from the corrector 210 into a plurality of color subfields. The simulator 220 calculates a simulation image using the decomposed image, the refresh rate RP as a projection parameter outputted from the projection section 110, and the exposure time E as a capture parameter outputted from the capture section 120.

Here, as indicated by the double-dot dashed arrow shown in FIG. 4, the simulator 220 according to this embodiment may output a signal indicating the timing of capturing the projection surface by the capture section 120 to the capture section 120.

The method for calculating a simulation image is further described.

Figure 5:
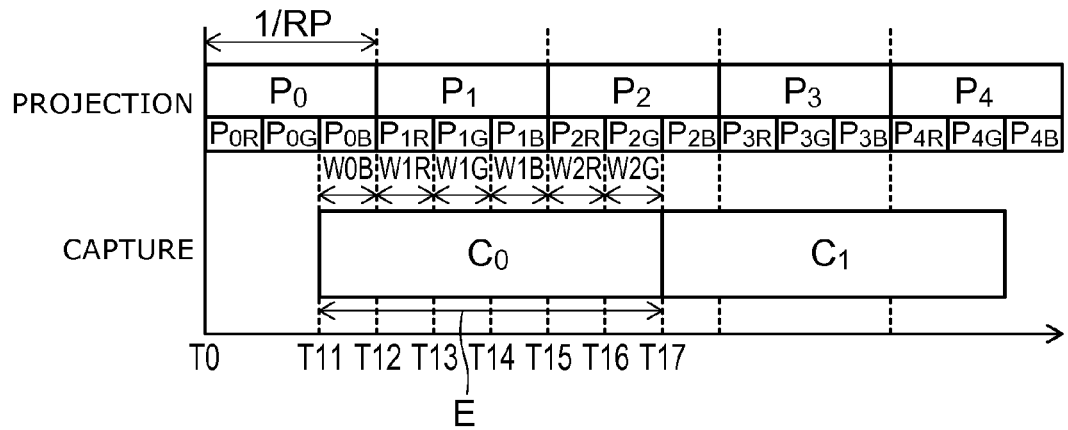
FIG. 5 is a timing chart illustrating an example of the method for calculating a simulation image of this embodiment.

FIG. 5 is a timing chart illustrating an example of the method for calculating a simulation image of this embodiment.

The horizontal axis of the timing chart shown in FIG. 5 represents time.

The upper row of the timing chart shown in FIG. 5 represents the period in which the projection section 110 performs projection. The projection section 110 projects correction images $P_0$, $P_1$, . . . , each for 1/RP seconds. In other words, the projection section 110 switches projection of the correction images $P_0$, $P_1$, . . . for every 1/RP seconds.

The lower row of the timing chart shown in FIG. 5 represents the period in which the capture section 120 performs capture. The capture section 120 acquires capture images $C_0$, $C_1$, . . . , each for E seconds. In other words, the capture section 120 switches acquisition of the capture images $C_0$, $C_1$, . . . for every E seconds.

In the case where the driving scheme of the projection section 110 is field sequential driving, the projection section 110 decomposes each of the correction images $P_0$, $P_1$, $P_2$, . . . into color subfields such as red, green, and blue. For instance, in the correction image $P_0$, the projection section 110 projects correction images $P_{0R}$, $P_{0G}$, and $P_{0B}$. For instance, in the case of projecting the correction image $P_0$, the projection section 110 projects a correction image $P_{0R}$ regarding red. Subsequently, the projection section 110 projects a correction image $P_{0G}$ regarding green. Subsequently, the projection section 110 projects a correction image $P_{0B}$ regarding blue.

The time period in which the correction image $P_{0B}$ is received by the capture device of the capture section 120 is W0B (timing T11-T12). The time period in which the correction image $P_{1R}$ is received by the capture device of the capture section 120 is W1R (timing T12-T13). The time period in which the correction image $P_{1G}$ is received by the capture device of the capture section 120 is W1G (timing T13-T14). The time period in which the correction image $P_{1B}$ is received by the capture device of the capture section 120 is W1B (timing T14-T15). The time period in which the correction image $P_{2R}$ is received by the capture device of the capture section 120 is W2R (timing T15-T16). The time period in which the correction image $P_{2G}$ is received by the capture device of the capture section 120 is W2G (timing T16-T17).

The simulator 220 generates an image by integrating a plurality of past correction images depending on the capture time of the capture section 120. Specifically, the simulator 220 decomposes the correction images $P_0$, $P_1$, and $P_2$ into color subfields such as red, green, and blue. The simulator 220 calculates a simulation image by making a weighted sum of the correction images in the respective color subfields depending on the ratio of the time period in which the correction image is received by the capture device in each color subfield. That is, the simulator 220 calculates a simulation image by making a weighted sum of the correction images $P_{0B}$, $P_{1R}$, $P_{1G}$, $P_{1B}$, $P_{2R}$, and $P_{2G}$ depending on the ratio of the time periods W0B, W1R, W1G, W1B, W2R, and W2G. The time period W0B is a time period in which the correction image $P_{0B}$ is received by the capture device. The time period W1R is a time period in which the correction image $P_{1R}$ is received by the capture device. The time period W1G is a time period in which the correction image $P_{1G}$ is received by the capture device. The time period W1B is a time period in which the correction image $P_{1B}$ is received by the capture device. The time period W2R is a time period in which the correction image $P_{2R}$ is received by the capture device. The time period W2G is a time period in which the correction image $P_{2G}$ is received by the capture device. The simulator 220 outputs the calculated simulation image to the parameter calculator 230.

According to this embodiment, even in the case where the driving scheme of the projection section 110 is field sequential driving, the simulator 220 generates a simulation image in view of the change of the projection image based on field sequential driving and outputs it to the parameter calculator 230. Thus, accurate information regarding the projection surface can be estimated.

Here, for instance, a black image may be inserted e.g. between the correction image $P_0$ and the correction image $P_1$ or between the correction image $P_1$ and the correction image $P_2$. A black image is projected by e.g. turning off the backlight of the liquid crystal projector. Alternatively, an image with a black color displayed generally entirely on the projection surface is written to the liquid crystal panel of the liquid crystal projector. Also in this case, the simulator 220 generates a simulation image in view of the change of the projection image and outputs it to the parameter calculator 230. Thus, accurate information regarding the projection surface can be estimated in the parameter calculator 230.

The information regarding automatic control of the exposure time in the capture parameters outputted from the capture section 120 may indicate that automatic control is active. In this case, each time the simulator 220 generates a simulation image, the simulator 220 acquires the exposure time E of the capture parameter outputted from the capture section 120, and calculates a simulation image using the exposure time E. Specifically, in the case where the exposure time E is relatively long, the simulator 220 generates a simulation image using a past correction image of a relatively long time. In the case where the exposure time E is relatively short, the simulator 220 generates a simulation image using a past correction image of a relatively short time.

Thus, even in the case where automatic control of the exposure time of the capture section 120 is active, a simulation image is generated in view of the change of the projection image depending on the various change of the exposure time, and outputted to the parameter calculator 230. Thus, accurate information regarding the projection surface can be estimated.

Furthermore, the simulator 220 acquires the refresh rate RC of the capture parameter outputted from the capture section 120, and calculates a simulation image using the refresh rate RC. Specifically, in the case where the refresh rate RC preset in the capture section 120 is relatively low, the simulator 220 calculates a simulation image using a past correction image of a relatively long time. In the case where the refresh rate RC preset in the capture section 120 is relatively high, the simulator 220 calculates a simulation image using a past correction image of a relatively short time.

FIGS. 6A to 6D are schematic views describing the case where the projection scheme of the projection section of this embodiment is a line sequential scheme.

Figure 6A:
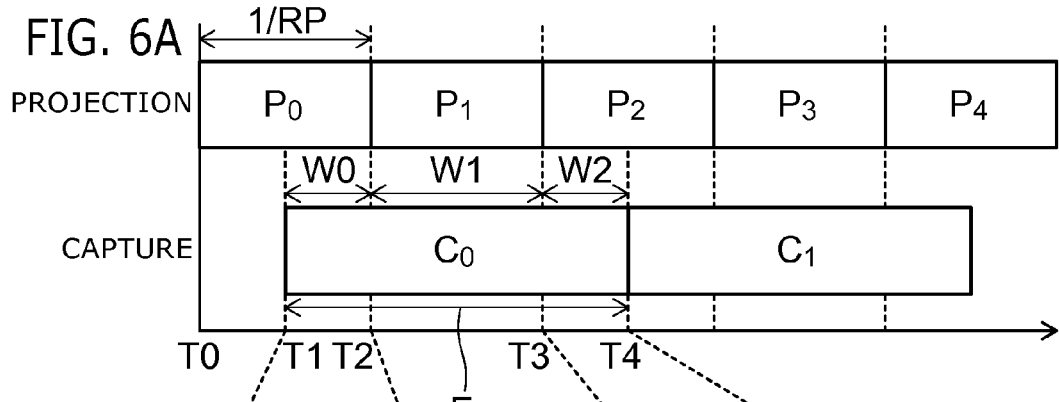
FIGS. 6A to 6D are schematic views describing the case where the projection scheme of the projection section of this embodiment is a line sequential scheme.
Figure 6B:
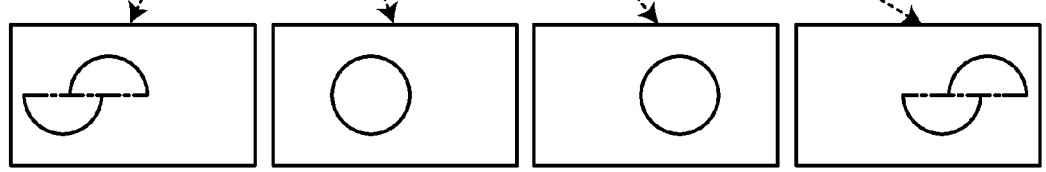
Figure 6C:
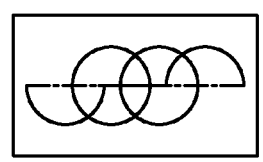
Figure 6D:
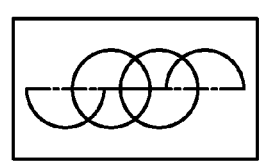

FIG. 6A is a timing chart illustrating an alternative example of the method for calculating a simulation image of this embodiment. FIG. 6B is a schematic plan view showing a projection image of this embodiment. FIG. 6C is a schematic plan view showing an image captured by the capture section of this embodiment. FIG. 6D is a schematic plan view showing a simulation image of this embodiment.

The timing chart shown in FIG. 6A is similar to the timing chart described above with reference to FIG. 3.

In the case where the projection scheme of the projection section 110 is a line sequential scheme, each of the correction images $P_0$, $P_1$, and $P_2$ is rewritten over the prescribed time period of 1/RP seconds based on the refresh rate RP. Thus, as shown in FIG. 6B, in the correction image $P_0$ projected on the projection surface by the projection section 110 at timing T1, for instance, the upper part of the projection image has been rewritten. On the other hand, the lower part of the projection image may have yet to be rewritten. Such a rewriting state occurs also at timing T4.

Then, as shown in FIG. 6C, the image obtained by capturing a scene on the projection surface by the capture section 120 includes a mixture of correction images projected during timings T1-T4.

The driving method parameter in the projection parameters outputted from the projection section 110 may indicate that the driving method is a line sequential scheme.

In this case, the simulator 220 calculates a simulation image by making a weighted sum of the correction images $P_0$, $P_1$, and $P_2$ depending on the ratio of the time periods W0, W1, and W2. The time period W0 is a time period in which the correction image $P_0$ is received by the capture device. The time period W1 is a time period in which the correction image $P_1$ is received by the capture device. The time period W2 is a time period in which the correction image $P_2$ is received by the capture device. The simulation image calculated by the simulator 220 is as shown in e.g. FIG. 6D.

The parameter calculator 230 calculates the reflectance H of the projection surface as a correction parameter and the outside light offset G of the projection surface as a correction parameter using the simulation image (FIG. 6D) outputted from the simulator 220 and the capture image (FIG. 6C) outputted from the capture section 120. The parameter calculator 230 outputs the calculated reflectance H and the calculated outside light offset G to the corrector 210.

According to this embodiment, even in the case where the projection scheme of the projection section 110 is a line sequential scheme, the simulator 220 generates a simulation image in view of the rewriting state of the projection image and outputs it to the parameter calculator 230. Thus, accurate information regarding the projection surface can be estimated in the parameter calculator 230.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processor comprising processing circuitry configured to at least:
   receive a first image and a second image;
   calculate a third image using the first image, wherein the second image corresponds to an image of a projection surface acquired using a first image capture parameter when the third image is projected on the projection surface;
   calculate a fourth image using the third image, based on one or both of a first exposure time and a first imaging timing of the first image capture parameter;
   calculate a correction parameter relating to one or both of a texture of the projection surface and a color of the projection surface using the fourth image and the second image; and
   calculate a revised third image using the first image and the correction parameter.

2. The processor according to claim 1, wherein the processing circuitry is configured to calculate the fourth image by integrating a plurality of past images based on the first exposure time.

3. The processor according to claim 1, wherein the processing circuitry is configured to calculate the fourth image by making a weighted sum of a plurality of past images depending on a ratio of a first time period to a second time period, the third image being projected on the projection surface in the first time period, the projection surface being imaged in the second time period.

4. The processor according to claim 3, wherein the processing circuitry is configured to calculate the fourth image using a first past image based on the first exposure time being a first time value, and to calculate the fourth image using a second past image based on the first exposure time being a second time value,
   the second time value is longer than the first time value,
   the first past image is imaged using a first past exposure time,
   the second past image is imaged using a second past exposure time, and
   the second past exposure time is longer than the first past exposure time.

5. The processor according to claim 1, wherein the processing circuitry is configured to calculate the fourth image using a first past image based on the first exposure time being a first time value, and to calculate the fourth image using a second past image based on the first exposure time being a second time value
   the second time value is longer than the first time value,
   the first past image is imaged using a first refresh rate,
   the second past image is imaged using a second refresh rate, and
   the second refresh rate is lower than the first refresh rate.

6. The processor according to claim 1, wherein the correction parameter includes reflectance of the projection surface and brightness of reflection light of an outside light being reflected at the projection surface, the outside light not including light of the third image.

7. The processor according to claim 1, wherein the first image includes a moving image.

8. An image processing method comprising:
receiving a first image and a second image;
calculating a third image using the first image, wherein the second image corresponds to an image of a projection surface acquired using a first image capture parameter when the third image is projected on the projection surface;
calculating a fourth image using the third image, based on one or both of a first exposure time and a first imaging timing of the first image capture parameter;
calculating a correction parameter relating to one or both of a texture of the projection surface and a color of the projection surface using the fourth image and the second image; and
calculating a revised third image using the first image and the correction parameter.

9. The method according to claim 8, wherein the fourth image is calculated by integrating a plurality of past images based on the first exposure time.

10. The method according to claim 8, wherein the fourth image is calculated by making a weighted sum of a plurality of past images depending on a ratio of a first time period to a second time period, the third image being projected on the projection surface in the first time period, the projection surface being imaged in the second time period.

11. The method according to claim 8, wherein the fourth image is calculated using a first past image based on the first exposure time being a first time value, and the fourth image is calculated using a second past image based on the first exposure time being a second time value,
the second time value is longer than the first time value,
the first past image is imaged using a first past exposure time,
the second past image is imaged using a second past exposure time, and
the second past exposure time is longer than the first past exposure time.

12. The method according to claim 8, wherein the fourth image is calculated using a first past image based on the first exposure time being a first time value, and the fourth image is calculated using a second past image based on the first exposure time being a second time value,
the second time value is longer than the first time value,
the first past image is imaged using a first refresh rate,
the second past image is imaged using a second refresh rate, and
the second refresh rate is lower than the first refresh rate.

13. The method according to claim 8, wherein reflectance of the projection surface and brightness of reflection light of an outside light are calculated as the correction parameter, the outside light being reflected at the projection surface, the outside light not including light of the third image.

14. An image projector comprising:
a camera;
a projector; and
processing circuitry configured to at least:
receive a first image and a second image;
calculate a third image using the first image, wherein the second image corresponds to image of a projection surface captured by the camera using a first image capture parameter when the third image is projected by the projector on the projection surface;
calculate a fourth image using the third image, based on one or both of a first exposure time and a first imaging timing of the first image capture parameter;
calculating a correction parameter relating to at least one of a texture of the projection surface and a color of the projection surface using the fourth image and the second image,
calculating a revised third the image using the first image and the correction parameter.

15. The projector according to claim 14, wherein the processing circuitry is configured to calculate the fourth image by integrating a plurality of past images based on the first exposure time.

16. The projector according to claim 14, wherein the processing circuitry is configured to calculate the fourth image by making a weighted sum of a plurality of past images depending on a ratio of a first time period to a second time period, the third image being projected on the projection surface in the first time period, the projection surface being imagedin the second time period.

17. The projector according to claim 14, wherein
the processing circuitry is configured to calculate the fourth image further using a projection parameter ,and
the projection parameter relates to a condition used by the projector when projecting.

18. The projector according to claim 14, wherein
the processing circuitry is configured to calculate the fourth image using a first past image based on the first exposure time being a first time value, and to calculate the fourth image using a second past image based on the first exposure time being a second time value,
the second time value is longer than the first time value,
the first past image is imaged using a first past exposure time,
the second past image is imaged using a second past exposure time, and
the second past exposure time is longer than the first past exposure time.

19. The projector according to claim 14, wherein
the processing circuitry is configured to calculate the fourth image using a first past image based on the first exposure time being a first time value, and to calculate the fourth image using a second past image based on the first exposure time being a second time value,
the second time value is longer than the first time value,
the first past image is imaged using a first refresh rate,
the second past image is imaged using a second refresh rate, and
the second refresh rate is lower than the first refresh rate.

20. The projector according to claim 14, wherein the correction parameter includes reflectance of the projection surface and brightness of reflection light of an outside light being reflected at the projection surface, the outside light not including light of the third image.

* * * * *